United States Patent
Ji

(10) Patent No.: US 12,479,403 B2
(45) Date of Patent: Nov. 25, 2025

(54) BRAKE SYSTEM AND CONTROLLING METHOD THEREOF

(71) Applicant: HL MANDO CORPORATION, Pyeongtaek (KR)

(72) Inventor: Suhyun Ji, Seongnam (KR)

(73) Assignee: HL MANDO CORPORATION, Pyeongtaek (KR)

( * ) Notice: Subject to any disclaimer, the term of this patent is extended or adjusted under 35 U.S.C. 154(b) by 172 days.

(21) Appl. No.: 18/450,476

(22) Filed: Aug. 16, 2023

(65) Prior Publication Data

US 2024/0239313 A1 Jul. 18, 2024

(30) Foreign Application Priority Data

Jan. 18, 2023 (KR) .................. 10-2023-0007627

(51) Int. Cl.
*B60T 7/22* (2006.01)
*B60T 8/171* (2006.01)

(52) U.S. Cl.
CPC ............. *B60T 7/22* (2013.01); *B60T 8/171* (2013.01); *B60T 2201/024* (2013.01); *B60T 2270/416* (2013.01)

(58) Field of Classification Search
CPC ...... B60T 7/22; B60T 8/171; B60T 2201/024; B60T 2270/416
See application file for complete search history.

(56) References Cited

U.S. PATENT DOCUMENTS

2021/0245704 A1  8/2021  Ricke

FOREIGN PATENT DOCUMENTS

| DE | 102014209162 A1 | * | 11/2015 | ............... B60T 7/22 |
| DE | 102017219917 A1 | * | 5/2019 | |
| JP | H0652471 A | * | 2/1994 | |
| JP | 2017030657 A | * | 2/2017 | |
| KR | 20220048524 A |   | 4/2022 | |

OTHER PUBLICATIONS

Schwartz, J; DE 10 2014 209 162, machine translation. (Year: 2015).*
Odate, S; JP 2017-030657, machine translation. (Year: 2017).*
Brok, T; DE 10 2017 219 917, machine translation. (Year: 2019).*

* cited by examiner

*Primary Examiner* — Mark L. Greene
(74) *Attorney, Agent, or Firm* — Harvest IP Law, LLP

(57) ABSTRACT

Disclosed herein are a brake system and a controlling method thereof. The brake system in accordance with the present embodiment includes a wheel speed sensor configured to output a signal responding to a speed of a vehicle, a pressure detection sensor configured to output a signal responding to a braking pressure of the vehicle, and a controller configured to detect whether the vehicle has an accident, based on a signal received from a shock detection senor configured to output a signal responding to a shock applied to the vehicle, and detect whether the wheel speed sensor has an abnormality based on the signal received from the wheel speed sensor, and the controller performs deceleration control of the vehicle based on the signal received from the wheel speed sensor when detecting that the wheel speed sensor has no abnormality and performs the deceleration control of the vehicle based on the signal received from the pressure detection sensor when detecting that the wheel speed sensor has the abnormality.

18 Claims, 6 Drawing Sheets

BRAKE SYSTEM AND CONTROLLING METHOD THEREOF

CROSS-REFERENCE TO RELATED APPLICATION

This application claims the benefit of Korean Patent Application No. 10-2023-0007627, filed on Jan. 18, 2023 in the Korean Intellectual Property Office, the disclosure of which is incorporated herein by reference.

BACKGROUND

1. Field

Embodiments of the present disclosure relate to a brake system and a controlling method thereof and, more particularly, to a brake system capable of preventing a secondary collision through deceleration control of a vehicle after a collision accident of the vehicle and a controlling method thereof.

2. Description of the Related Art

A brake system for performing braking is essentially installed in a vehicle, and various types of brake systems have been proposed for the safety of drivers and passengers.

In a conventional brake system, a method of supplying hydraulic pressure required for braking to wheel cylinders using a mechanically connected booster when a driver steps on a brake pedal has been mainly used.

However, recently, a brake system that receives a driver's intention to brake through an electrical signal and operates an electrical device such as a motor based on the electrical signal to provide a braking force to the vehicle is widely used.

When a collision accident of a vehicle occurs, such a brake system measures a speed of the accident vehicle using a wheel speed sensor provided on a wheel side of the vehicle and performs deceleration and braking based on the measured speed, thereby preventing a secondary collision.

However, such a conventional brake system has a problem in that it cannot respond to a secondary collision when a situation such as direct damage to a wheel speed sensor or the like for measuring a speed of a vehicle or some wheels being separated from the ground occurs due to a collision accident.

SUMMARY

Therefore, it is an aspect of the present disclosure to provide a brake system capable of preventing a secondary collision by providing a quick and reliable braking force even when a wheel speed sensor is damaged by an accident of a vehicle, and a controlling method thereof.

Additional aspects of the disclosure will be set forth in part in the description which follows and, in part, will be obvious from the description, or may be learned by practice of the disclosure.

In accordance with one aspect of the present disclosure, a brake system includes a wheel speed sensor configured to output a signal responding to a speed of a vehicle, a pressure detection sensor configured to output a signal responding to a braking pressure of the vehicle, and a controller configured to detect whether a vehicle has an accident, based on a signal received from a shock detection senor configured to output a signal responding to a shock applied to the vehicle, and detect whether the wheel speed sensor has an abnormality, based on the signal received from the wheel speed sensor, and the controller performs deceleration control of the vehicle based on the signal received from the wheel speed sensor when detecting that the wheel speed sensor has no abnormality and performs the deceleration control of the vehicle based on the signal received from the pressure detection sensor when detecting that the wheel speed sensor has the abnormality.

The controller may perform the deceleration control of the vehicle by generating and outputting a braking signal following a preset target longitudinal deceleration based on the signal received from the wheel speed sensor.

The controller may perform the deceleration control of the vehicle by generating and outputting a braking signal following a preset target braking pressure based on the signal received from the pressure detection sensor.

Herein, the target braking pressure may be set to follow a preset target longitudinal deceleration.

The controller may detect whether the wheel speed sensor has the abnormality only when detecting that the vehicle has the accident.

The controller may receive the signal from the pressure detection sensor only when detecting that the wheel speed sensor has the abnormality.

The controller may detect that the vehicle has the accident by receiving an airbag deployment signal output upon deployment of an airbag installed in the vehicle to be deployed or not deployed based on the signal received from the shock detection sensor.

Meanwhile, the brake system may further include a vehicle stop detection sensor configured to output a signal responding to a stop of the vehicle.

Herein, the controller may suspend the deceleration control of the vehicle based on the signal received from the vehicle stop detection sensor.

In addition, the controller may perform the deceleration control of the vehicle by generating and outputting a braking signal following a preset target longitudinal deceleration based on the signal received from the wheel speed sensor until receiving the signal from the vehicle stop detection sensor or perform the deceleration control of the vehicle by generating and outputting a braking signal following a preset target braking pressure based on the signal received from the pressure detection sensor.

In accordance with another aspect of the present disclosure, a controlling method of a brake system includes detecting whether a vehicle has an accident based on a signal received from a shock detection sensor configured to output a signal responding to a shock applied to the vehicle, detecting whether a wheel speed sensor has an abnormality based on a signal received from the wheel speed sensor configured to output a signal responding to speed of the vehicle when the accident of the vehicle is detected, performing deceleration control of the vehicle based on the signal received from the wheel speed sensor, when the abnormality of the wheel speed sensor is not detected, and performing the deceleration control of the vehicle based on a signal received from a pressure detection sensor configured to output a signal responding to a braking pressure of the vehicle when the abnormality of the wheel speed sensor is detected.

The performing of the deceleration control of the vehicle may include performing the deceleration control of the vehicle by generating and outputting a braking signal following a preset target longitudinal deceleration based on the signal received from the wheel speed sensor.

The performing of the deceleration control of the vehicle may include performing the deceleration control of the vehicle by generating and outputting a braking signal following a preset target braking pressure based on the signal received from the pressure detection sensor.

Herein, the target braking pressure may be set to follow a preset target longitudinal deceleration.

The detecting of whether the wheel speed sensor has the abnormality may be performed only when detecting that the vehicle has the accident.

The receiving of the signal responding to the braking pressure of the vehicle from the pressure detection sensor may be performed only when detecting that the wheel speed sensor has the abnormality.

The detecting of whether the vehicle has the accident may include receiving an airbag deployment signal output upon deployment of an airbag installed in the vehicle to be deployed or not deployed based on the signal received from the shock detection sensor.

Meanwhile, the controlling method may further include suspending the deceleration control of the vehicle based on a signal received from a vehicle stop detection sensor configured to output a signal responding to a stop of the vehicle.

Herein, the performing of the deceleration control of the vehicle may include performing the deceleration control of the vehicle by generating and outputting a braking signal following a preset target longitudinal deceleration based on the signal received from the wheel speed sensor until receiving the signal from the vehicle stop detection sensor.

In addition, the performing of the deceleration control of the vehicle may include performing the deceleration control of the vehicle by generating and outputting a braking signal following a preset target braking pressure based on the signal received from the pressure detection sensor until receiving the signal from the vehicle stop detection sensor.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings may omit the illustration of parts not related to the description in order to clarify the present disclosure, and slightly exaggerate the size of the components to help understanding.

Figure 1:
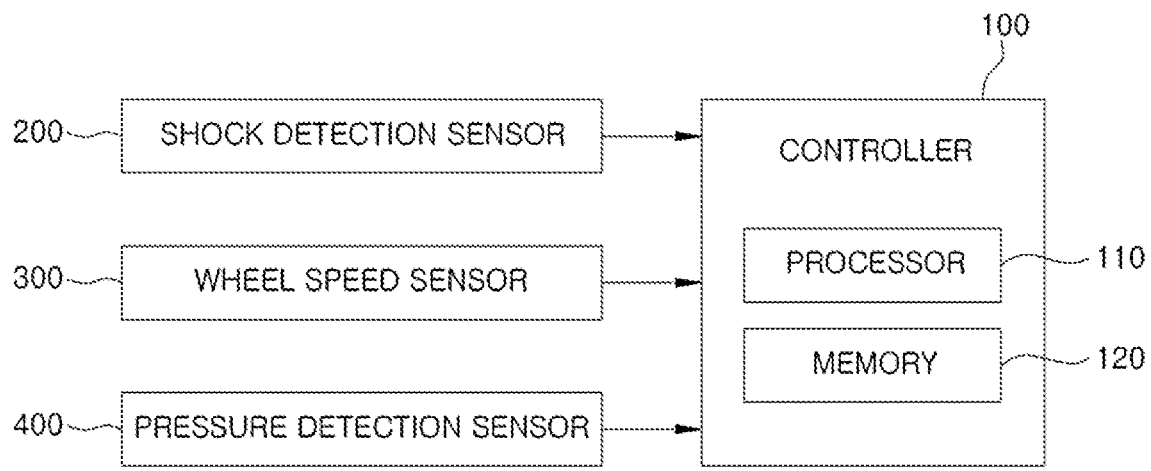
FIG. 1 is a block diagram illustrating a main configuration of a brake system in accordance with one embodiment of the present disclosure.

FIG. 1 is a block diagram illustrating a main configuration of a brake system in accordance with one embodiment of the present disclosure.

Referring to FIG. 1, the brake system in accordance with one embodiment of the present disclosure includes a controller 100 configured to perform deceleration control of a vehicle based on signals respectively received from a shock detection sensor 200 configured to output a signal responding to a shock applied to a vehicle, a wheel speed sensor 300 configured to output a signal responding to a speed of the vehicle, and a pressure detection sensor 400 configured to output a signal responding to a braking pressure of the vehicle.

More specifically, the signal output from the shock detection sensor 200 and responding to the shock applied to the vehicle may operate an airbag installed in the vehicle or may be received directly by the controller 100, and the controller 100 may determine whether the vehicle has a collision by receiving an operation signal of the airbag or the signal output from the shock detection sensor 200.

To this end, the shock detection sensor 200 may be provided in plural at various locations such as a front side, a rear side, a lateral side, or the like of the vehicle.

The wheel speed sensor 300 may be provided on each wheel of the vehicle to output a signal responding to a speed of the vehicle. Accordingly, the controller 100 may detect the speed of the vehicle by receiving the signal output from the wheel speed sensor 300, receive an error detection signal corresponding to a fault state of the wheel speed sensor 300, and determine whether the wheel speed sensor 300 fails.

The pressure detection sensor 400 may be provided at a brake master cylinder or a master booster of the vehicle to output the signal responding to the braking pressure of the vehicle. Accordingly, the controller 100 may receive the signal output from the pressure detection sensor 400 and detect the braking pressure of the vehicle.

Meanwhile, the controller 100 may include a processor 110 and a memory 120.

The processor 110 may control an overall operation of the brake system in accordance with one embodiment of the present disclosure.

The memory 120 may store a program for processing or controlling the processor 110 and various data for operating the brake system in accordance with one embodiment of the present disclosure.

As an example, the memory 120 may include not only volatile memories such as an S-RAM and a D-RAM but also non-volatile memories such as a flash memory, a read only memory (ROM), and an erasable programmable read only memory (EPROM).

In addition, the controller 100 detects whether the vehicle has an accident based on the signal received from the shock detection sensor 200, and when detecting that the vehicle has the accident, detects whether the wheel speed sensor 300 has an abnormality based on the signal received from the wheel speed sensor 300.

Herein, when detecting that there is no abnormality of the wheel speed sensor 300, the controller 100 performs the deceleration control of the vehicle by generating and outputting a braking signal following a preset target longitudinal deceleration based on the signal received from the wheel speed sensor 300.

On the other hand, when detecting that the wheel speed sensor 300 has the abnormality, the controller 100 performs the deceleration control of the vehicle by generating and outputting a braking signal following a preset target braking pressure based on the signal received from the pressure detection sensor 400.

Herein, the target braking pressure may be set to follow the preset target longitudinal deceleration.

Meanwhile, only when detecting that the vehicle has the accident, the controller 100 may detect whether the wheel speed sensor 300 has the abnormality to further improve efficiency of the processor 110.

In addition, only when detecting that the wheel speed sensor 300 has the abnormality, the controller 100 may receive the signal from the pressure detection sensor 400 to further improve efficiency of the processor 110.

In addition, as described above, the controller 100 may also detect that the vehicle has the accident by receiving an airbag deployment signal output upon deployment of an airbag installed in the vehicle to be deployed or not deployed based on the signal received from the shock detection sensor 200.

Meanwhile, the brake system in accordance with one embodiment of the present disclosure may further include a vehicle stop detection sensor (not shown) configured to output a signal responding to a stop of the vehicle.

Herein, the controller 100 may suspend the deceleration control of the vehicle based on the signal received from the vehicle stop detection sensor.

More specifically, the controller 100 may perform the deceleration control of the vehicle by generating and outputting the braking signal following the preset target longitudinal deceleration based on the signal received from the wheel speed sensor 300 until receiving the signal from the vehicle stop detection sensor or perform the deceleration control of the vehicle by generating and outputting the braking signal following the preset target braking pressure based on the signal received from the pressure detection sensor 400.

Figure 2:
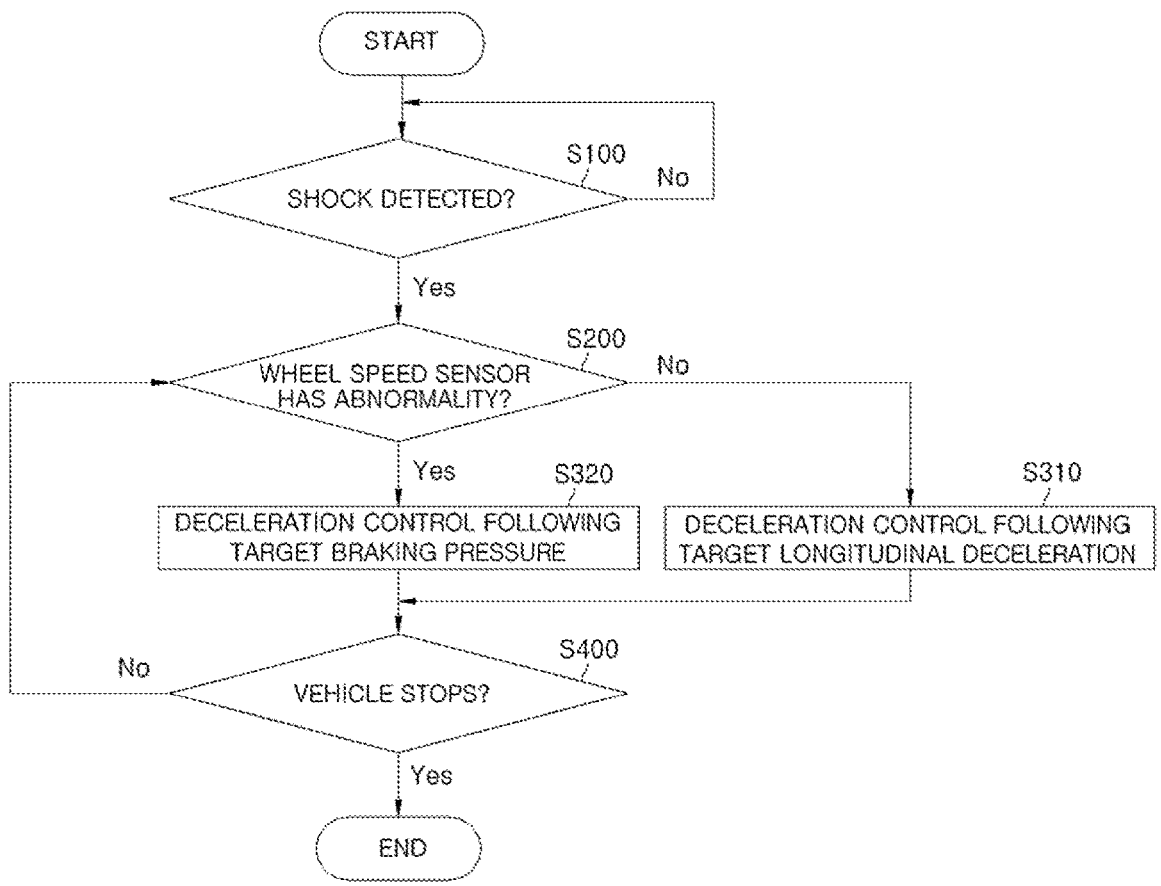
FIG. 2 is a flowchart illustrating an operation algorithm of the brake system in accordance with one embodiment of the present disclosure.

Meanwhile, FIG. 2 is a flowchart illustrating an operation algorithm of the brake system in accordance with one embodiment of the present disclosure.

Referring to FIG. 2, the controller 100 detects (100) whether the vehicle has the accident based on the signal received from the shock detection sensor 200.

Herein, the controller 100 maintains a standby state when detecting that the vehicle has no accident, and detects (200) whether the wheel speed sensor 300 has the abnormality based on the signal received from the wheel speed sensor 300 when detecting that the vehicle has the accident.

Next, when detecting that there is no abnormality of the wheel speed sensor 300, the controller 100 performs the deceleration control (310) of the vehicle by generating and outputting the braking signal following the preset target longitudinal deceleration based on the signal received from the wheel speed sensor 300.

Herein, the controller 100 continues the deceleration control (310) of the vehicle by generating and outputting the braking signal following the preset target longitudinal deceleration based on the signal received from the wheel speed sensor 300 until receiving the signal output from the vehicle stop detection sensor.

Meanwhile, when detecting that the wheel speed sensor 300 has the abnormality, the controller 100 performs the deceleration control (320) of the vehicle by generating and outputting a braking signal following a preset target braking pressure based on the signal received from the pressure detection sensor 400.

Herein, as illustrated in FIG. 2, the controller 100 may continuously detect (200) whether the wheel speed sensor 300 has the abnormality based on the signal received from the wheel speed sensor 300 until receiving the signal output from the vehicle stop detection sensor, while performing the deceleration control (320) of the vehicle by generating and outputting the braking signal following the preset target braking pressure based on the signal received from the pressure detection sensor 400.

Accordingly, when detecting that there is no abnormality of the wheel speed sensor 300, the controller 100, which performs the deceleration control (320) of the vehicle by generating and outputting the braking signal following the preset target braking pressure based on the signal received from the pressure detection sensor 400, may continue the deceleration control (310) of the vehicle by generating and outputting the braking signal following the preset target longitudinal deceleration based on the signal received from the wheel speed sensor 300 until receiving the signal output from the vehicle stop detection sensor, instead of the deceleration control (320) of the vehicle by generating and outputting the braking signal following the preset target braking pressure based on the signal received from the pressure detection sensor 400.

Thus, the brake system in accordance with the embodiment of the present disclosure may prevent a secondary collision by providing a quick and reliable braking force even when the wheel speed sensor 300 is damaged by an accident of the vehicle.

Figure 3:
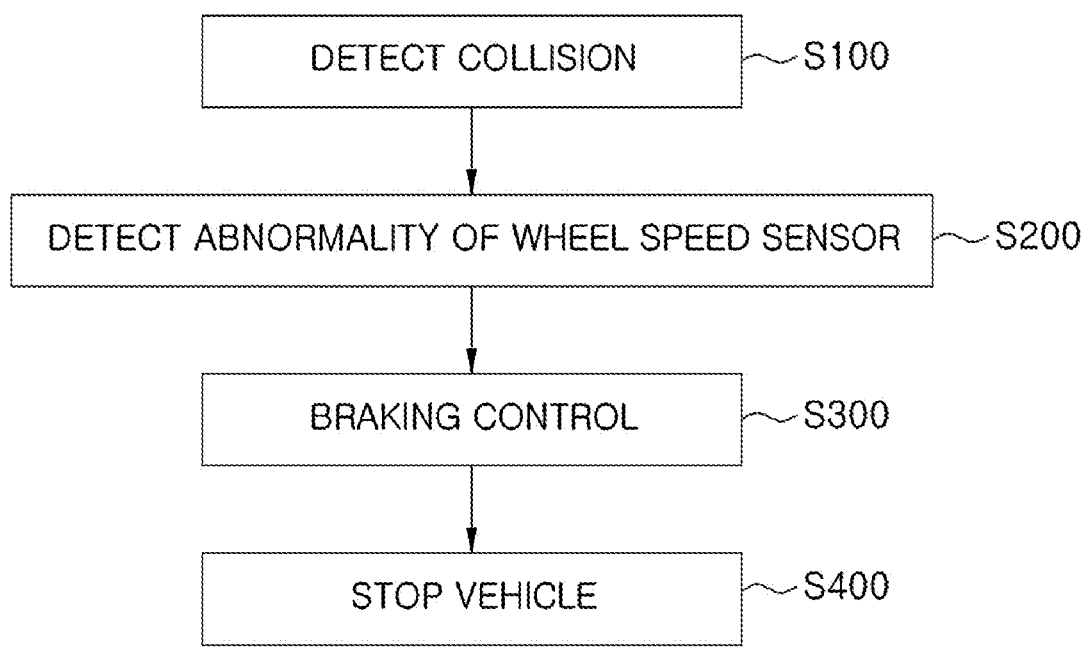
FIG. 3 is a flowchart illustrating a sequence of a controlling method of the brake system in accordance with one embodiment of the present disclosure.

Meanwhile, FIG. 3 is a flowchart illustrating a sequence of a controlling method of the brake system in accordance with one embodiment of the present disclosure.

Referring to FIG. 3, the controlling method of the brake system in accordance with one embodiment of the present disclosure detects (100) whether a vehicle has an accident based on a signal received from the shock detection sensor 200 configured to output a signal responding to a shock applied to the vehicle, when the accident of the vehicle is detected, detects (200) whether the wheel speed sensor 300 has an abnormality based on a signal received from the wheel speed sensor 300 configured to output a signal responding to speed of the vehicle, and stops (400) the vehicle by performing deceleration control (300) to brake the vehicle according to whether the wheel speed sensor 300 has the abnormality.

Thus, the controlling method of the brake system in accordance with the embodiment of the present disclosure may prevent a secondary collision by providing a quick and reliable braking force even when a wheel speed sensor is damaged by an accident of a vehicle.

Figure 4:
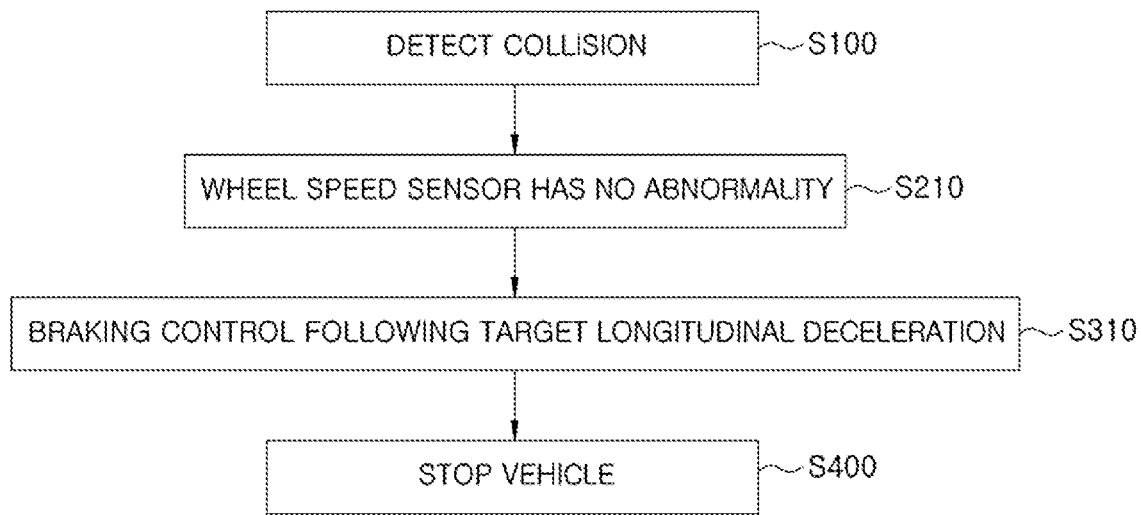
FIG. 4 is a flowchart illustrating a sequence in which deceleration control following a target longitudinal deceleration is performed in the controlling method of the brake system in accordance with one embodiment of the present disclosure.

FIG. 4 is a flowchart illustrating a sequence in which deceleration control following a target longitudinal deceleration is performed in the controlling method of the brake system in accordance with one embodiment of the present disclosure.

Referring to FIG. 4, the performing of the deceleration control (300) includes performing the deceleration control (310) of the vehicle by generating and outputting a braking signal following a preset target longitudinal deceleration based on the signal received from the wheel speed sensor 300 when detecting that there is no abnormality of the wheel speed sensor 300 (210).

Figure 5:
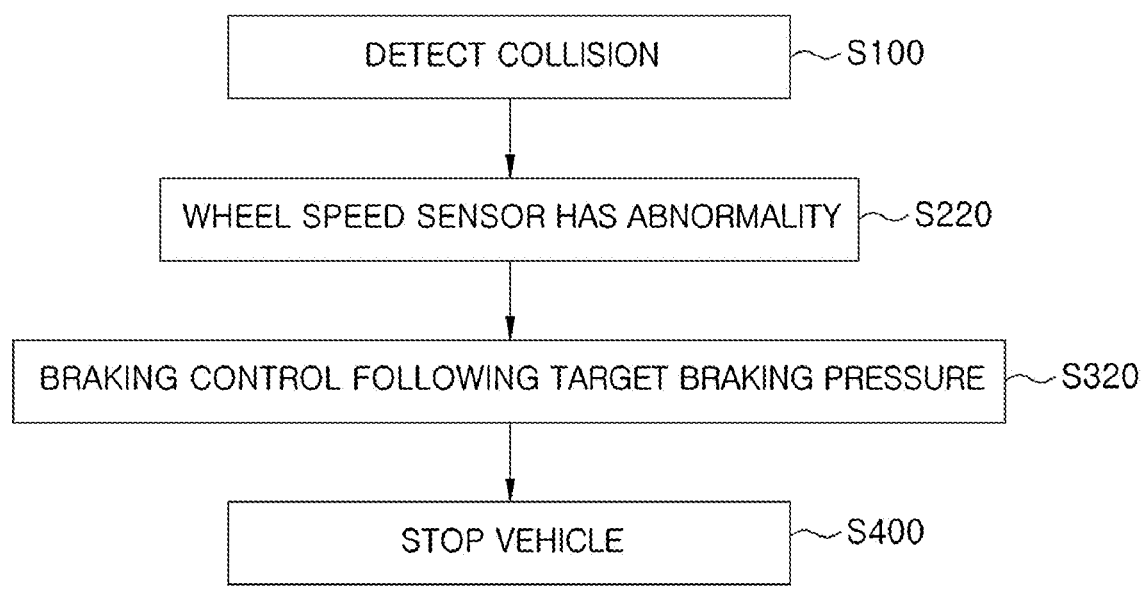
FIG. 5 is a flowchart illustrating a sequence in which deceleration control following a target braking pressure is performed in the controlling method of the brake system in accordance with one embodiment of the present disclosure.

FIG. 5 is a flowchart illustrating a sequence in which deceleration control following a target braking pressure is performed in the controlling method of the brake system in accordance with one embodiment of the present disclosure.

Referring to FIG. 5, the performing of the deceleration control (300) includes performing the deceleration control (320) of the vehicle by generating and outputting a braking signal following a preset target braking pressure based on the signal received from the pressure detection sensor 400 when detecting that the wheel speed sensor 300 has the abnormality (220).

Herein, the target braking pressure may be set to follow the preset target longitudinal deceleration.

In addition, the detecting (200) of whether the wheel speed sensor has the abnormality may be performed only when detecting that the vehicle has an accident.

In addition, the receiving of the signal responding to a braking pressure of the vehicle from the pressure detection sensor 400 may be performed only when detecting that the wheel speed sensor 300 has an abnormality.

In addition, the detecting (100) of whether the vehicle has an accident may include receiving an airbag deployment signal output upon deployment of an airbag installed in the vehicle to be deployed or not deployed based on the signal received from the shock detection sensor 200.

Meanwhile, the controlling method of the brake system in accordance with one embodiment of the present disclosure may further include suspending the deceleration control of the vehicle based on a signal received from a vehicle stop detection sensor configured to output a signal responding to a stop of the vehicle.

Herein, the performing of the deceleration control (300) of the vehicle may include performing the deceleration control (310) of the vehicle by generating and outputting a braking signal following a preset target longitudinal deceleration based on the signal received from the wheel speed sensor 300 until receiving the signal from the vehicle stop detection sensor or performing the deceleration control (320) of the vehicle by generating and outputting a braking signal following a preset target braking pressure based on the signal received from the pressure detection sensor 400.

Figure 6:
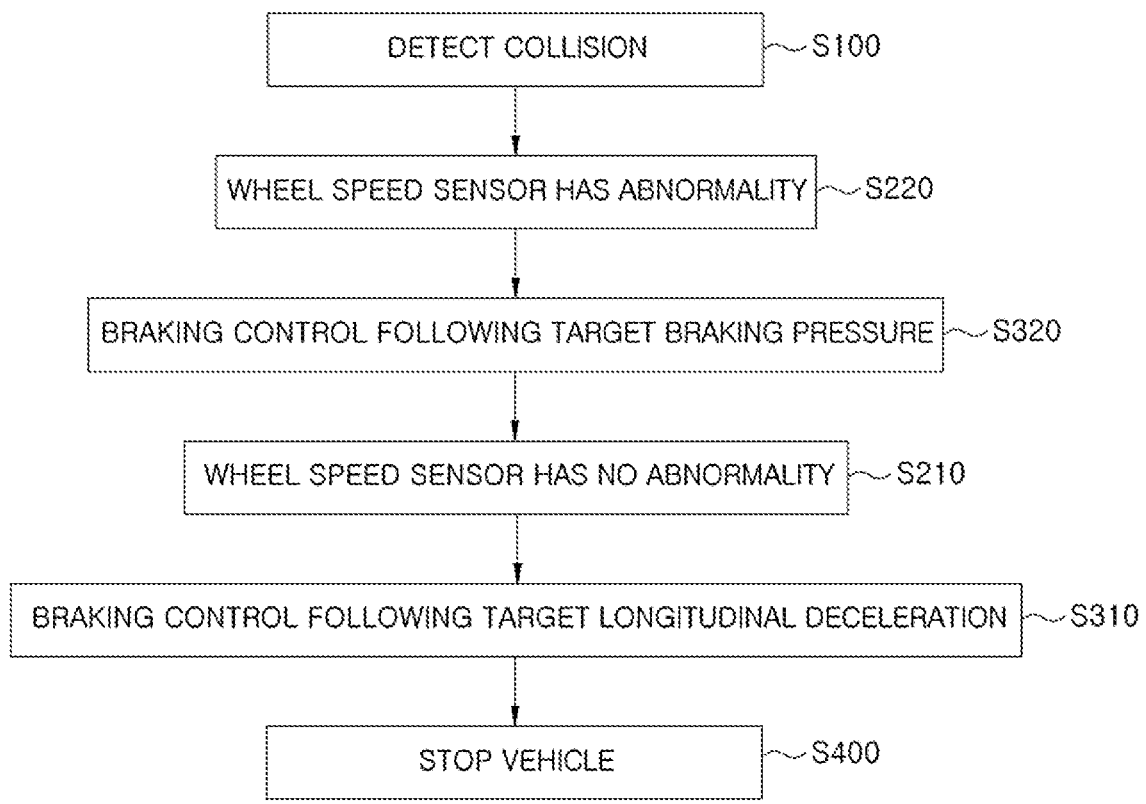
FIG. 6 is a flowchart illustrating a sequence in a case where the deceleration control following a target braking pressure is changed to the deceleration control following a target longitudinal deceleration in the controlling method of the brake system in accordance with one embodiment of the present disclosure.

FIG. 6 is a flowchart illustrating a sequence in a case where the deceleration control following a target braking pressure is changed to deceleration control following a target longitudinal deceleration in the controlling method of the brake system in accordance with one embodiment of the present disclosure.

Referring to FIG. 6, in the controlling method of the brake system in accordance with one embodiment of the present disclosure, when detecting that there is no abnormality of the wheel speed sensor 300, the controller 100, which performs the deceleration control (320) of the vehicle by generating and outputting the braking signal following the preset target braking pressure based on the signal received from the pressure detection sensor 400, may continue the deceleration control (310) of the vehicle by generating and outputting the braking signal following the preset target longitudinal deceleration based on the signal received from the wheel speed sensor 300 until receiving the signal output from the vehicle stop detection sensor, instead of the deceleration control (320) of the vehicle by generating and outputting the braking signal following the preset target braking pressure based on the signal received from the pressure detection sensor 400.

Thus, the controlling method of the brake system in accordance with the embodiment of the present disclosure can prevent a secondary collision by providing a quick and reliable braking force even when a wheel speed sensor is damaged by an accident of a vehicle.

A brake system in accordance with an embodiment of the present disclosure and a controlling method thereof can prevent a secondary collision by providing a quick and reliable braking force even when a wheel speed sensor is damaged by an accident of a vehicle.

As described above, the disclosed embodiments have been described with reference to the accompanying drawings. Those skilled in the art will understand that the present disclosure can be implemented in a form different from the disclosed embodiments without changing the technical spirit or essential features of the present disclosure. The disclosed embodiments are exemplary and should not be construed as limiting.

What is claimed is:

1. A brake system comprising:
a pressure detection sensor configured to output a signal responding to a braking pressure of a vehicle; and
a controller configured to detect whether the vehicle has an accident based on a signal received from a shock detection sensor configured to output a signal responding to a shock applied to the vehicle, and detect whether a wheel speed sensor has an abnormality based on a signal received from the wheel speed sensor configured to output a signal responding to a speed of a vehicle,
wherein the controller performs a deceleration control of the vehicle based on the signal received from the wheel speed sensor when detecting that the wheel speed sensor has no abnormality, and
performs the deceleration control of the vehicle based on the signal received from the pressure detection sensor when detecting that the wheel speed sensor has the abnormality,
wherein the controller performs the deceleration control of the vehicle by generating and outputting a braking signal following a preset target braking pressure based on the signal received from the pressure detection sensor.

2. The brake system of claim 1, wherein the controller performs the deceleration control of the vehicle by generating and outputting a braking signal following a preset target longitudinal deceleration based on the signal received from the wheel speed sensor.

3. The brake system of claim 1, wherein the target braking pressure is set to follow a preset target longitudinal deceleration.

4. The brake system of claim 1, wherein the controller detects whether the wheel speed sensor has the abnormality only when detecting that the vehicle has the accident.

5. The brake system of claim 1, wherein the controller receives the signal from the pressure detection sensor only when detecting that the wheel speed sensor has the abnormality.

6. The brake system of claim 1, wherein the controller detects that the vehicle has the accident by receiving an airbag deployment signal output upon deployment of an airbag installed in the vehicle to be deployed or not deployed based on the signal received from the shock detection sensor.

7. The brake system of claim 1, further comprising a vehicle stop detection sensor configured to output a signal responding to a stop of the vehicle.

8. The brake system of claim 7, wherein the controller suspends the deceleration control of the vehicle based on the signal received from the vehicle stop detection sensor.

9. The brake system of claim 7, wherein the controller performs the deceleration control of the vehicle by generating and outputting a braking signal following a preset target longitudinal deceleration based on the signal received from the wheel speed sensor until receiving the signal from the vehicle stop detection sensor, or performs the deceleration control of the vehicle by generating and outputting a braking signal following a preset target braking pressure based on the signal received from the pressure detection sensor.

10. A controlling method of a brake system, the method comprising:

detecting whether a vehicle has an accident based on a signal received from a shock detection sensor configured to output a signal responding to a shock applied to the vehicle;

detecting whether a wheel speed sensor has an abnormality based on a signal received from the wheel speed sensor configured to output a signal responding to a speed of the vehicle in response to detecting the accident of the vehicle;

performing a deceleration control of the vehicle based on the signal received from the wheel speed sensor when the abnormality of the wheel speed sensor is not detected; and performing the deceleration control of the vehicle based on a signal received from a pressure detection sensor configured to output a signal responding to a braking pressure of the vehicle when the abnormality of the wheel speed sensor is detected, wherein the performing of the deceleration control of the vehicle includes performing the deceleration control of the vehicle by generating and outputting a braking signal following a preset target braking pressure based on the signal received from the pressure detection sensor.

11. The method of claim 10, wherein the performing of the deceleration control of the vehicle includes performing the deceleration control of the vehicle by generating and outputting a braking signal following a preset target longitudinal deceleration based on the signal received from the wheel speed sensor.

12. The method of claim 10, wherein the target braking pressure is set to follow a preset target longitudinal deceleration.

13. The method of claim 10, wherein the detecting of whether the wheel speed sensor has the abnormality is performed only when detecting that the vehicle has the accident.

14. The method of claim 10, wherein the receiving of the signal responding to the braking pressure of the vehicle from the pressure detection sensor is performed only when detecting that the wheel speed sensor has the abnormality.

15. The method of claim 10, wherein the detecting of whether the vehicle has the accident includes receiving an airbag deployment signal output upon deployment of an airbag installed in the vehicle to be deployed or not deployed based on the signal received from the shock detection sensor.

16. The method of claim 10, further comprising suspending the deceleration control of the vehicle based on a signal received from a vehicle stop detection sensor configured to output a signal responding to a stop of the vehicle.

17. The method of claim 16, wherein the performing of the deceleration control of the vehicle includes performing the deceleration control of the vehicle by generating and outputting a braking signal following a preset target longitudinal deceleration based on the signal received from the wheel speed sensor until receiving the signal from the vehicle stop detection sensor.

18. The method of claim 16, wherein the performing of the deceleration control of the vehicle includes performing the deceleration control of the vehicle by generating and outputting a braking signal following a preset target braking pressure based on the signal received from the pressure detection sensor until receiving the signal from the vehicle stop detection sensor.

* * * * *